United States Patent [19]

Tallerico

[11] 4,023,186
[45] May 10, 1977

[54] DISPOSABLE MARKER AND HOLDER

[75] Inventor: William A. Tallerico, Willingboro, N.J.

[73] Assignee: Graphic Controls Corporation, Cherry Hill, N.J.

[22] Filed: Aug. 5, 1975

[21] Appl. No.: 602,106

[52] U.S. Cl. .............................. 346/140 A; 346/49
[51] Int. Cl.$^2$ ...................................... G01D 15/16
[58] Field of Search ............. 346/140 A, 140 R, 49

[56] References Cited

UNITED STATES PATENTS

| | | | |
|---|---|---|---|
| 3,611,430 | 10/1971 | Watchorn | 346/140 A |
| 3,686,680 | 8/1972 | Bruzzano | 346/140 A |
| 3,778,840 | 12/1973 | Dahl | 346/140 A |
| 3,893,130 | 7/1975 | Browning | 346/140 A |

Primary Examiner—Joseph W. Hartary
Attorney, Agent, or Firm—Miller & Prestia

[57] ABSTRACT

Improved upper and lower paired pen markers adapted to pass over one another with minimum spacing utilize interchangeable pen cartridges which are generally flat and rectilinear with the nib of the upper cartridge being slightly longer than that of the lower cartridge. The upper cartridge is supported from above in a holder with a front overhang lip, a sidewall positioning holding member and rear spring clips. As the bottom cartridge holder supports the bottom surface of the cartridge it also includes a sidewall positioning holding member and rear spring clips. Mispositioning of cartridge and holder is minimized despite the generally flat cartridge configuration.

10 Claims, 3 Drawing Figures

U.S. Patent May 10, 1977 4,023,186
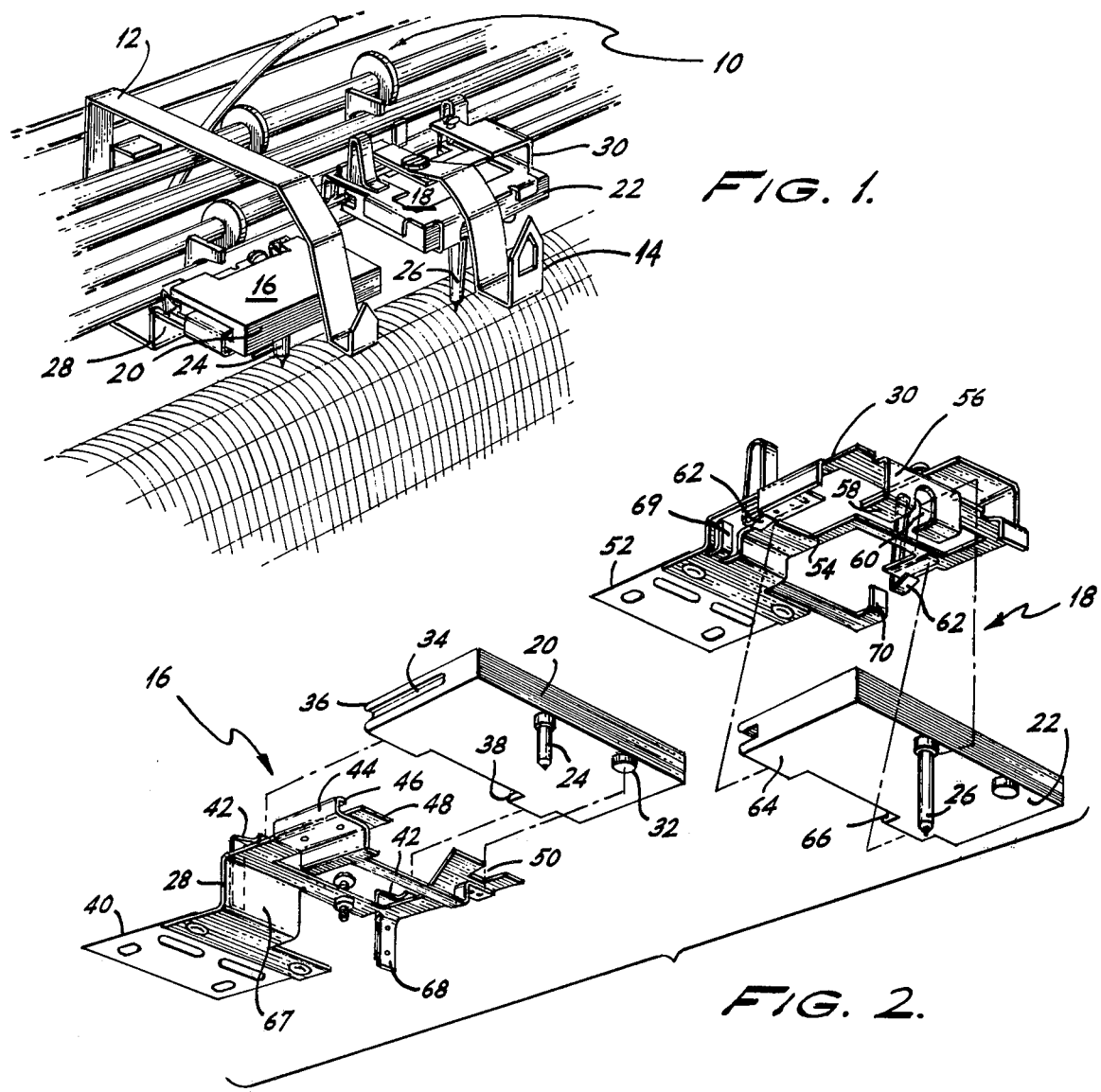
FIG. 1.
FIG. 2.
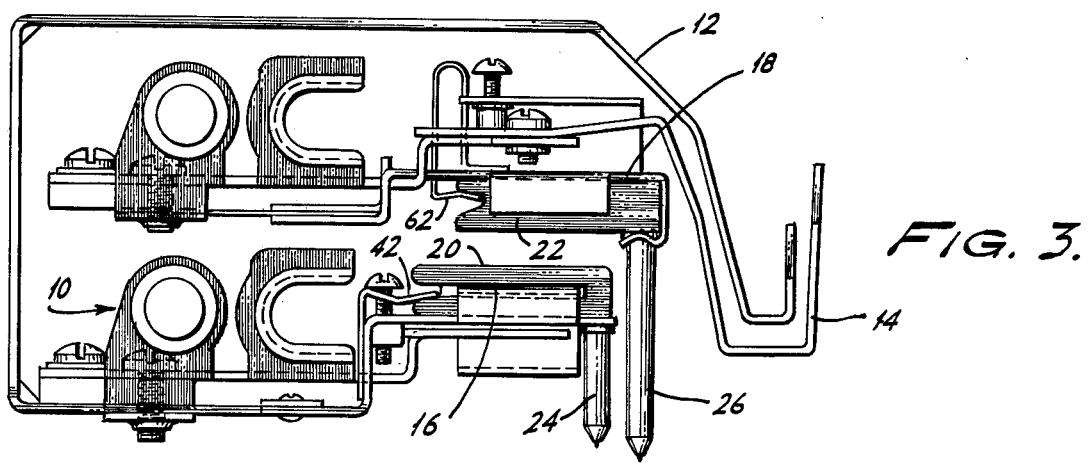
FIG. 3.

DISPOSABLE MARKER AND HOLDER

This invention pertains to pen cartridge and holder assemblies particularly adapted to be used in paired markers where pen cartridges are required to pass over one another and where space is limited.

This invention pertains particularly to a pen cartridge and holder wherein the holder may be disposed either above or below the cartridge and the cartridge is substantially identical in either case, the opposite surface of the cartridge, either the top or bottom, being substantially planar, permitting free movement of the paired cartridge thereover.

Instruments in which dual markers simultaneously record different variables on a common chart, in which individual writing means are required to pass over one another from time to time, are well-known. Various marker and marker means for use in such instruments have been divised, of which but two examples are shown in U.S. Pat. No. 1,537,339— Watts and U.S. Pat. No. 3,611,430—Watchorn. Still other types of cartridge and cartridge holders for use in paired assemblies are seen, for example, in U.S. Pat. No. 3,778,840.

Notwithstanding these prior art devices, there has remained a need for a paired pen and pen holder assembly in which the space occupied by the pen cartridge and pen holder is minimized and the accessability of the pen for replacement and maintenance is optimized.

It is the general object of the present invention to provide a disposable marker pen cartridge for such a paired marker instrument assembly, particularly to provide such a cartridge and paired holder assembly in which replacement of the disposable market pen is facilitated and the pen cartridge, while occupying minimum space, is securely positioned in the instrument.

This object and others which will become apparent in the course of the subsequent description of this invention, are met, briefly, by a flat rectilinear instrument pen cartridge, preferably of the fibrous reservoir disposable marker type, adapted to top and bottom support. This cartridge includes relatively large surface area, parallel, flat top and bottom outer surfaces, a rear outer surface with at least one rearward projection adapted to engage a spring clip holder at laterally spaced positions, substantially flat parallel outer side surfaces and a pen nib projecting downward from said bottom surface. In addition to the nib, the bottom surface of the cartridge may include, at a laterally spaced point from the nib, a downwardly projecting positioning member.

This pen cartridge may be supported from above or below. In the preferred paired assembly embodiment of the present invention, an upper riding pen and holder assembly includes the cartridge with a top support passing over a lower riding pen and holder assembly in which the cartridge is supported from the bottom. The bottom supported pen and holder assembly includes a holder with a bottom member supporting the lower surface of the cartridge with an indentation engaging the sides of a downwardly projecting member, either the nib or the separate positioning member on the bottom surface of the cartridge. The holder also includes a side holding member or guide abutting a side surface of the cartridge. This side guide may include an inwardly turned lip, the mating cartridge including engagement projections on the side surface defining a depression running along the length of the side surface and into which the inwardly turned lip fits. At the rear of the cartridge, the holder includes a rearwardly deformable spring clip and means adapted to engage the rearward projections on the cartridge. Preferably, the rearward projections comprise two laterally spaced pairs of projections between which the spring clip fits. Mounting of the cartridge in the holder is accomplished by pressing the rearward projections in the rear spring clips and pushing the positioning hub into the holder indentation.

The top riding holder and pen assembly includes a holder with a similar side guide and rear holding members but further including a top member overlying the upper surface of the cartridge, the top holding member also including a front overhang and rearwardly turned lip fitting over the front of the cartridge with an indentation to engage laterally either the nib or another downwardly projecting positioning member.

This invention may be better understood by reference to the following detailed description thereof, taken in conjunction with the appended claims and figures, in which:

FIG. 1 is a perspective view showing the paired pen cartridge and holder assembly as used in an instrument marking means;

FIG. 2 is an exploded perspective view of the interchangeable pen cartridge of the present invention shown as used with both top and bottom holder; and FIG. 3 is a side view showing the spaced relationship of the paired pen cartridge and holder of the present invention.

Referring more specifically to FIG. 1, there is shown the marker portion of a paired marker instrument including the marker carriage 10, the visual indicating pointers 12 and 14, associated respectively with paired markers 16 and 18, each comprised of a cartridge 20 and 22, respectively, with nibs 24 and 26, respectively and holders 28 and 30 respectively.

Details of the respective markers 16 and 18 are better seen in the exploded view of FIG. 2 in which the lower riding marker 16 is seen to include cartridge 20 with downwardly projecting positioning member 32 and laterally spaced pairs of rearward projections 36 and 38.

In general, it will be noted that cartridge 20 is designed for optimum space utilization within the instrument by virtue of its flat rectilinear configuration.

The holder 28 for lower riding cartridge 20 in marker 16 comprises a rearwardly extending spring mount 40 for mounting marker 16 in the proper position in marker carriage 10 (shown in FIGS. 1 and 3). This spring urges the market against the recorder chart paper with the appropriate pressure for making a good recording trace. Holder 28 further includes rear spring clips 42, which are slightly rearwardly deformable to permit assembly of cartridge 20 and holder 28 and which, upon assembly engage rearward projections 36 and 38 and abut the rear surface of cartridge 20.

To assist in securely positioning cartridge 20 in holder 28, a sidewall guide is provided. The cartridge sidewall and holder sidewall guide may be flat, as shown with holder 30 and cartridge 22 or they may include, as seen on holder 28 and cartridge 20, a laterally extending positioning depression 34 and mating inwardly turned lip 46. Generally in any paired marker system, one or the other (but not both) of these side guide-cartridge configurations would be used so that a single cartridge (with a choice of nib lengths) could be used in either of the markers.

The bottom support member 48, upon which the bottom surface of cartridge 20 rests, includes an indentation 50 in which downwardly projecting member 32 is engaged.

Marker 18 is similar, particularly with respect to cartridge 22, which is identical in all respects to cartridge 20, and interchangeable therewith, except for the length of nib 26, which is somewhat longer than nib 24, in order to permit the upper riding marker 18 to ride on the same surface as the lower riding marker 16.

Holder 30 for upper riding marker 18 also includes a marker carriage mount 52, a main cartridge holding member 54, which upon assembly of cartridge 22 with holder 30 overlies the top surface of cartridge 22, and which includes a frontal overhang 56 with a rearwardly turned lip 58 having an indentation 60 for laterally engaging the base of nib 26. In this case, the nib is used as the downwardly projecting lateral positioning member. Spring clip 62 is provided, with slight rearward deformability for assembly of cartridge 22 and marker 18, and for engaging, upon assembly, rearward projections 64 and 66 in cartridge 22.

The relative positions of overriding marker 18 and underriding marker 16 may be better seen by reference to the side view of FIG. 3, in which it is seen that the flat rectilinear configuration of markers 20 and 22 minimize the space, and particularly the vertical height, required by the paired markers and their assembled holders.

An important operational feature of the cartridge-holder combination of the present invention is the ease with which cartridges may be replaced in their repsective holders with minimum inconvenience and minimum stress of other system components. This is accomplished primarily by virtue of the present design which permits insertion of cartridges and complete alignment with little effort and deformation of any holder members until the very last part of cartridge travel during insertion. This is further facilitated by the deformability of rear holding clips 42 and 62, each projecting perpendicularly from a vertical surface which permits finger resistance pressure to be exerted as cartridges are inserted in the holder to permit the rear clips 42 and 62 to be deformed slightly backwardly but to insure that all stress is upon the clips themselves during cartridge insertion and not upon the marker holders 40 and 52. This is accomplished in the underriding marker 16 by placing fingers behind the tab from which project clips 42. In the overriding marker 18, this is accomplished by placing a finger behind tabs 69 and 70. These tabs 69 and 70 also prevent permanent deformation of holding clips 62. As the cartridge pushes back toward these tabs, the resistance finger pressure prevents stress from being passed back to the cartridge holder and permits slight deformation so that the cartridge may be dropped into place in the holder.

While this invention has been described with reference to specific embodiments, it will be apparent to those skilled in the art that various other embodiments of the invention and various modificatons of that shown may be devised. The appended claims are intended to be construed to include all such embodiments and modifications of the present invention which may be made by those skilled in the art without departing from the true spirit and scope thereof.

I claim:

1. Flat, rectilinear instrument pen cartridge adaptable to top or bottom support, said cartridge having parallel flat top and bottom outer surfaces, and an elongated rear outer surface having at least one rearward projection adapted to engage a spring clip at laterally spaced positions along said elongated rear surface, said rearward projection also adapted to facilitate frictional holding of said cartridge by the engagement of said spring clip therein, substantially flat parallel outer side surfaces, and a pen nib projecting downwardly from said bottom surfaces.

2. Cartridge, as recited in claim 1, further including a positioning projection projecting downwardly from said bottom surface.

3. Cartridge, as recited in claim 1, one of said side surfaces including a positioning depression along the length thereof adapted to engage a side holding member.

4. Holder and pen assembly comprising a pen cartridge as recited in claim 1, and a holder therefor, said holder including
   1. a bottom member supporting the lower surface of said cartridge and adapted to engage the sides of a downwardly projecting positioning member disposed on the bottom surface of said cartridge,
   2. a side holding member attached to said holder bottom member and adapted to engage one of said side surfaces of said cartridge, and
   3. rearwardly deformable spring clip means adapted to engage said rearward projections on the rear surface of said cartridge.

5. Assembly, as recited in claim 4, one of said cartridge side surfaces including a positioning depression along the length thereof, said side holding member including means for engaging said positioning depression.

6. Assembly, as recited in claim 5, wherein said side holding member includes an inwardly turned lip fitting into said depression.

7. Holder and pen assembly, comprising a pen cartridge as recited in claim 1, and a holder therefor, said holder including
   1. a top member overlying the top surface of said cartridge, with a front overhang and rearwardly projecting lip, said lip including an indentation in which is laterally engaged said downwardly projecting nib,
   2. a side holding member attached to said top member and adapted to engage one of said side surfaces of said cartridge, and
   3. rearwardly deformable spring clip means adapted to engage said rearward projections on the rear surface of said cartridge.

8. Assembly, as recited in claim 7, one of said cartridge side surfaces including a positioning depression along the length thereof, said side holding member including means for engaging said side positioning depression.

9. Assembly, as recited in claim 8, wherein said side holding member includes an inwardly turned lip fitting into said depression.

10. Paired pen and holder assemblies, including a first pen and holder assembly as recited in claim 7, and a second pen holder assembly, said second pen and holder assembly comprising a pen cartridge in combination with a holder, said pen cartridge having parallel flat top and bottom outer surfaces, a rear outer surface having at least one rearward projection adapted to engage a spring clip at laterally spaced positions on said rear surface, substantially flat parallel outer side surfaces, a positioning projection projecting downwardly from said bottom surface, and a pen nib projecting downwardly from said bottom surface, and holder for said cartridge including:
1. a bottom member supporting the lower surface of said cartridge and engaging the sides of said downwardly projecting positioning member,
2. a side holding member attached to said holder bottom member and adapted to engage one of said side surfaces of said cartridge, and,
3. rearwardly reformable spring clip means adapted to engage said rearward projections on the rear surface of said cartridge; the nib of said first pen and holder assembly being longer than that of said second pen and holder assembly, said first pen and holder assembly being located above and forward of said second pen and holder assembly.

* * * * *

UNITED STATES PATENT AND TRADEMARK OFFICE
CERTIFICATE OF CORRECTION

PATENT NO. : 4,023,186
DATED : May 10, 1977
INVENTOR(S) : William A. Tallerico

It is certified that error appears in the above-identified patent and that said Letters Patent are hereby corrected as shown below:

Col. 2, line 53, delete "market" and insert --marker--;

Col. 2, line 62, after "guide" insert --44--;

Col. 3, line 28, delete "markers" and insert --cartridges--;

Col. 3, line 48, delete "40 and 52" and insert --28 and 30--;

Col. 3, line 62, delete "modificatons" and insert --modification

Col. 4, line 11, delete "surfaces" and insert --surface--;

Col. 6, line 4, delete "reformable" and insert --deformable--.

Signed and Sealed this

Fourth Day of September 1979

[SEAL]

Attest:

LUTRELLE F. PARKER
Attesting Officer    Acting Commissioner of Patents and Trademarks